United States Patent
Demaj et al.

(10) Patent No.: US 10,789,477 B2
(45) Date of Patent: Sep. 29, 2020

(54) METHOD AND APPARATUS FOR REAL-TIME DETECTION OF A SCENE

(71) Applicant: STMicroelectronics (Rousset) SAS, Rousset (FR)

(72) Inventors: Pierre Demaj, Nice (FR); Laurent Folliot, Gourdon (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 155 days.

(21) Appl. No.: 15/936,587

(22) Filed: Mar. 27, 2018

(65) Prior Publication Data

US 2018/0293441 A1   Oct. 11, 2018

(30) Foreign Application Priority Data

Apr. 5, 2017   (FR) ..................... 17 52947

(51) Int. Cl.
  *G06K 9/00*   (2006.01)
  *G06K 9/62*   (2006.01)
  *G06Q 50/10*   (2012.01)

(52) U.S. Cl.
  CPC ....... *G06K 9/00684* (2013.01); *G06K 9/6256* (2013.01); *G06K 9/6265* (2013.01); *G06K 9/6268* (2013.01); *G06Q 50/10* (2013.01)

(58) Field of Classification Search
  None
  See application file for complete search history.

(56) References Cited

U.S. PATENT DOCUMENTS 8,887,300 B1*  11/2014  Gates ............... H04L 63/10
                                                    713/168
2006/0215880 A1*  9/2006  Berthilsson ........ G06K 9/00771
                                                    382/103
(Continued)

FOREIGN PATENT DOCUMENTS

CN       102214263 A       10/2011
CN       102662729 A        9/2012
(Continued)

OTHER PUBLICATIONS

Hoseini-Tabatabael et al., "A Survey on Smartphone-Based Systems for Opportunistic User Context Recognition", University of Surrey, ACM Computing Surveys, Jun. 2013, 51 pages, vol. 45.
(Continued)

*Primary Examiner* — Hadi Akhavannik
(74) *Attorney, Agent, or Firm* — Slater Matsil, LLP (57) ABSTRACT

A method for real-time detection of at least one scene by an apparatus, from among a set of possible reference scenes, includes acquiring current values of attributes from measurement values supplied by sensors. The method further includes traversing a path through a decision tree. The nodes of the decision tree are respectively associated with the attributes. The traversal considers at each node along the path, the current value of the corresponding attribute, so as to obtain at the output of the path, a scene from among the set of reference scenes. The obtained scene identifying which reference scene is the detected scene. The method further includes developing a confidence index (SC) associated with the identification of the detected scene.

24 Claims, 7 Drawing Sheets

(56) References Cited

U.S. PATENT DOCUMENTS

| | | | |
|---|---|---|---|
| 2013/0002698 A1* | 1/2013 | Geiger | G06T 15/00 345/589 |
| 2014/0241617 A1* | 8/2014 | Shotton | G06K 9/00671 382/159 |
| 2014/0321243 A1 | 10/2014 | Guignard et al. | |
| 2015/0279182 A1 | 10/2015 | Kanaujia et al. | |
| 2016/0088286 A1 | 3/2016 | Forsythe et al. | |
| 2016/0092736 A1* | 3/2016 | Mai | G06K 9/00624 |
| 2018/0075300 A1 | 3/2018 | Mai et al. | |

FOREIGN PATENT DOCUMENTS

| | | |
|---|---|---|
| CN | 102968368 A | 3/2013 |
| CN | 104537710 A | 4/2015 |
| CN | 105117575 A | 12/2015 |
| CN | 105469029 A | 4/2016 |
| WO | 2012076711 A1 | 6/2012 |

OTHER PUBLICATIONS

Rakotomalala, Ricco, "Arbres de Decision", University Lumiere Lyon 2, 2005, 56 pages, Revue MODULAD.

\* cited by examiner

METHOD AND APPARATUS FOR REAL-TIME DETECTION OF A SCENE

CROSS-REFERENCE TO RELATED APPLICATIONS

This application claims priority to French Patent Application No. 1752947, filed on Apr. 5, 2017, which application is hereby incorporated herein by reference.

TECHNICAL FIELD

The present invention generally relates to the real-time detection of a scene by an apparatus, such as a wireless communication apparatus, e.g., an intelligent mobile cellular phone (smartphone) or a digital tablet, equipped with at least one sensor, e.g., an accelerometer.

BACKGROUND

A scene is understood in a very broad sense as notably encompassing a scene characteristic of the environment in which the apparatus is located, whether the apparatus is carried by a user capable of movement, e.g., a mobile cellular phone, (scene of the "bus", "train", "restaurant", "office", etc. type), or the apparatus is a fixed object, whether connected or not connected (a radiator, for example, in a home automation application), the scene characteristic of the environment possibly being, for example, of the "wet room", "dry room", "day", "night", "shutters closed", "shutters open", etc. type.

A scene may also encompass a scene characteristic of an activity practiced by the bearer of the apparatus, e.g., a smart watch. Then, such a scene could be, for example, "walking", "running", etc.

As to wireless communication apparatuses, some types of smartphones or tablets today are capable of scene detection, making it possible to determine the environment in which the phone or tablet user is located. This may thus make it possible for a third party, e.g., an advertiser or a cultural organization to send relevant information connected with the place where the user of the apparatus is located.

Thus, for example, if the user is located at a given tourist site, they may be sent restaurant addresses in the vicinity of the place where they are located. Similarly, they may also be sent information relating to certain historic buildings which are located in the vicinity of the place where they are located.

Scene detection is notably understood to mean a discrimination of the scene in which the wireless communication apparatus is located. Several known solutions exist for detecting (discriminating) a scene. These solutions use, for example, one or more dedicated sensors generally associated with a specific algorithm.

These sensors may be environmental measurement sensors, i.e., notably any type of sensor capable of supplying information on the environment in which the wireless communication apparatus is located. For example, spatiotemporal characteristics of the environment of the apparatus, e.g., the temporally frozen or not frozen character of the environment, the speed of evolution of spatiotemporal change in the environment (based on detecting the movement of the apparatus) or in the sound, spatial, or visual characteristics of this environment, e.g., the noise level of the environment, or the altitude or the brightness level of the environment.

Examples of sensors capable of supplying information on the environment include barometers, proximity sensors, optical sensors, etc.

These sensors may be used to give an indication of the spatial orientation of the apparatus, e.g., the gyroscope, so as to rotate the display on the screen of the apparatus. In a context where the apparatus is constantly powered up (Always-On) and where the battery life is an important criterion, these environmental sensors can be used for scene detection.

For a multimodal approach, the apparatus may use an algorithm implementing a binary decision tree on the basis of descriptors or attributes resulting from particular processing (e.g., filtering) on the raw data from the sensors. These attributes may be, for example, means, energy values, variances, etc.

Algorithms implementing a decision tree known to the person skilled in the art are described in the article by Syed Amir Hoseini-Tabatabaei and others entitled "A survey on Smartphone Based Systems for Opportunistic User Context Recognition", Centre for Communication Systems Research, University of Surrey, ACM computing surveys, 29 Jun. 2013, or to the article by Ricco Rakotomalala entitled "Arbres de Décision" (Decision Trees), Revue MODULAD, 2005, number 33, pages 163-187.

A decision tree comprises nodes interconnected by branches ending in leaves. Each node is associated with a test on an attribute, and each leaf corresponds to a reference scene belonging to a corpus or set of reference scenes capable of being detected by the apparatus at the end of the tree traversal. There may be multiple nodes in the tree associated with the same test on the same attribute. The nodes are connected by the branches. The choice of a branch from among those starting from a node depends on the value of the attribute in this node, and therefore the result of the test in this node. A decision tree is constructed for a corpus of scenes given by a conventional learning algorithm. One advantage of scene detection by a decision tree lies in the speed of execution.

SUMMARY

Embodiments of the invention can improve the reliability of the classification obtained at the output of a decision tree implemented within an apparatus, whether connected or not connected, for example, but not restrictively a wireless communication apparatus, a smart watch, or a motionless object.

According to an implementation and embodiment, provision is made to select the most appropriate attributes for discriminating a corpus of given scenes, the term "scene" being taken in a very broad sense as mentioned above.

According to one aspect, a method is provided for real-time detection of at least one scene by an apparatus, notably a wireless communication apparatus, e.g., a mobile cellular phone or a digital tablet, from among a set of possible reference scenes. Embodiments of the invention are described with respect to wireless communication apparatuses. It is understood, however, that the invention may apply to any type of apparatus and to any type of scene.

The method, according to this aspect, comprises an acquisition of current values of attributes from measurement values supplied by sensors and a traversal of a path within a decision tree. The nodes of the decision tree are associated with tests on these attributes. The current value of the corresponding attribute is taken into account at each node of the path. At the output of the path, a scene is obtained from among the set of reference scenes. The detected scene is formed from the obtained scene.

The method further includes a development of a confidence index associated with the detected scene. The confidence index improves the reliability of the detection, by delivering the actual detection (hard decision) accompanied by its confidence index (soft decision). This delivery makes it possible for a decision to be taken about a detected scene having, for example, a low confidence index. The decision depends on the intended application, and may include, for example, not taking into account this scene and taking into account the previously detected scene.

According to one implementation making it possible for a confidence index to be quickly and simply developed, this development is performed after the detection of the detected scene, and based on the knowledge of this detected scene. In particular, this development is performed by passing along an additional traversal of the path with the knowledge at each node of the detected scene. Moreover, the development of the confidence index may include an additional traversal of the path of the decision tree with the same current values of attributes. The additional traversal comprises, at each node of the path, taking into account a first probability that the corresponding attribute has the current value, knowing the detected scene. The additional traversal further comprises, for each reference scene different from the detected scene, taking into account a second probability that the corresponding attribute has the current value, knowing this reference scene. An initial confidence index is determined from all the first and second probabilities taken into account along the traversed path, and the development of the confidence index is performed from this initial confidence index.

Taking into account the first and second probabilities may comprise, for example, calculating in real time these probabilities from histograms, or more simply, reading in a memory of these probabilities, which have been pre-calculated. The confidence index may be the initial confidence index or the normalized confidence index involving the length of the path. In practice, the first and second probabilities may be read in a memory.

According to a possible variant, determining the initial confidence index includes determining, for each node of the path, the mean of the second probabilities associated with this node and the logarithm of a ratio between the first probability associated with this node and the mean, and a sum over all the nodes of the path of the logarithms.

According to another possible variant, determining the initial confidence index includes determining, for each node of the path, the mean of the second probabilities associated with this node and the logarithm of a ratio between the first probability associated with this node and the mean, and a sum over all the nodes of the path of the logarithms respectively weighted by weighting coefficients chosen to give more weight to the logarithms associated with the first nodes of the path. For example, each weighting coefficient is positive and may be less than or greater than 1, as the case may be. Thus, for an initial coefficient greater than 1, typically between 1 and 2, the weighting coefficient associated with a current node may be taken as equal to the square root of the weighting coefficient associated with the preceding node. As a variant, the weighting coefficient associated with a current node of rank i may be taken as equal to $\alpha^i$ where $\alpha$ is a positive coefficient and less than 1.

According to another possible variant, determining the initial confidence index includes determining, for each node of the path, the maximum of the second probabilities associated with this node and the logarithm of a ratio between the first probability associated with this node and the maximum, and a sum over all the nodes of the path of the logarithms. The confidence index may be considered as a score the values of which may generally be greater than one. Consequently, the method may further include a conversion of the confidence index into a confidence probability using a predetermined conversion function.

In some embodiments, some attributes may not be relevant for detecting some scenes. In other words, some attributes do not actually allow a particular reference scene to be discriminated. Consequently, the most relevant attributes may be selected for a corpus of reference scenes.

Thus, according to one embodiment, the method also includes a preliminary phase of determining the attributes, taking into account the set of possible reference scenes. This preliminary phase may be performed regardless of the detection method defined above. Thus, according to another aspect, a method of selection is provided for selecting reference attributes usable in a classifier configured for detecting a reference scene set or corpus. This classifier may be any type of classifier or a decision tree.

The preliminary phase or the method of selection may include a development for each reference attribute of a set of possible reference attributes, a merit factor representative of the ability of the reference attribute to discriminate the different reference scenes, and a selection of the attributes of the classifier or the decision tree from among the reference attributes according to their merit factor.

According to one embodiment, the selection includes, for each reference attribute, a comparison of the value of its merit factor with a threshold, and a selection as attributes, of the reference attributes having a value of merit factor below the threshold.

As a variant, it would be possible to classify the reference attributes by ascending order of their merit factor and to select as attributes a set number of reference attributes, e.g., the R first reference attributes thus classified.

According to one embodiment, the development of the merit factor of a reference attribute includes a development of intermediate parameters respectively relating to pairs of reference scenes, and a mean of all the intermediate parameters. The development of each intermediate parameter relates to a pair of reference scenes comprising a calculation of the canonical scalar product between a first distribution of probabilities of the values of the reference attribute, knowing a first reference scene of the pair, and a second distribution of probabilities of the values of the reference attribute, knowing a second reference scene of the pair. In order to limit the range of values on which the canonical scalar products may be produced, each first distribution of probabilities and each second distribution of probabilities may result from a filtering of the values of the considered attribute for the considered reference scene.

The sensors may be chosen, for example, from the group formed by an accelerometer, a gyroscope, a magnetometer, an audio sensor, a barometer, a proximity sensor, and an optical sensor.

According to another aspect, an apparatus is provided, e.g. a wireless communication apparatus. The apparatus includes sensors, a detector, an acquisition circuit, a controller, and a processor. The sensors are configured for supplying measurement values. The detector is configured for real-time detection of at least one scene from among a set or corpus of possible reference scenes. The detector comprises a memory storing a software module forming a decision tree. The nodes of the decision tree are respectively associated with tests on attributes and the outputs of the decision tree correspond to the possible reference scenes. The acquisition circuit is configured for acquiring current values of the attributes. The controller is configured for activating the execution of the software module with the current values of the attributes, so as to traverse a path within the decision tree and obtain at the output of the path a scene from among the set of reference scenes. The obtained scene forms the detected scene. The processor is configured for developing a confidence index associated with the detected scene.

According to one embodiment, the processor is configured for developing the confidence index once the scene has been detected and based on the knowledge of this detected scene.

According to another embodiment, the controller is configured for activating the software module a second time with the current values of the attributes and making it traverse the path a second time. The processor includes a first processing module configured for, at each node of the path, taking into account a first probability that the corresponding attribute has the current value, knowing the detected scene. For each reference scene different from the detected scene, the processing module is configured to take into account a second probability that the corresponding attribute has the current value knowing this reference scene. The processor further includes a second processing module configured for determining an initial confidence index from all the first and second probabilities taken into account along the traversed path, and a third processing module configured for performing the development of the confidence index from this initial confidence index.

According to one embodiment, the memory contains the first and second probabilities, and the first module is configured for reading the first and second probabilities in the memory.

According to one embodiment, the second processing module is configured for determining for each node of the path, the mean of the second probabilities associated with this node, and the logarithm of a ratio between the first probability associated with this node and the mean. The second processing module is further configured for summing said logarithms over all the nodes of the path.

As a variant, the second processing module is configured for determining for each node of the path, the mean of the second probabilities associated with this node and the logarithm of a ratio between the first probability associated with this node and the mean. The second processing module is further configured for summing said logarithms over all the nodes of the path respectively weighted by weighting coefficients chosen to give more weight to the logarithms associated with the first nodes of the path.

The weighting coefficient is, for example, positive and less than or greater than 1. The weighting coefficient associated with a current node may be equal to the square root of the weighting coefficient associated with the preceding node, the initial coefficient being greater than 1. As a variant, the weighting coefficient associated with a current node of rank i may be equal to $\alpha^i$ where $\alpha$ is a positive coefficient and less than 1.

According to another possible embodiment, the second processing module is configured for determining, for each node of the path, the maximum of the second probabilities associated with this node and the logarithm of a ratio between the first probability associated with this node and the maximum. The second processing module is further configured for summing the logarithms over all the nodes of the path.

The processor may include a third module configured for normalizing the initial confidence index involving the length of the path. The apparatus may further include a converter configured for converting the confidence index into a confidence probability using a conversion function stored in the memory. The sensors may be chosen from the group formed by an accelerometer, a gyroscope, a magnetometer, an audio sensor, a barometer, a proximity sensor, an optical sensor, a temperature, humidity, or brightness sensor.

The list and attributes of the foregoing features of the embodiments and variants is, however, not exhaustive.

The apparatus may be, for example, a mobile cellular phone or a digital tablet, or any type of smart object, especially a smart watch, optionally connected to an Internet network.

BRIEF DESCRIPTION OF THE DRAWINGS

Other advantages and features of the invention will appear on examination of the detailed description of implementations and embodiments, in no way restrictive, and the attached drawings in which.

DETAILED DESCRIPTION OF ILLUSTRATIVE EMBODIMENTS

Figure 1:
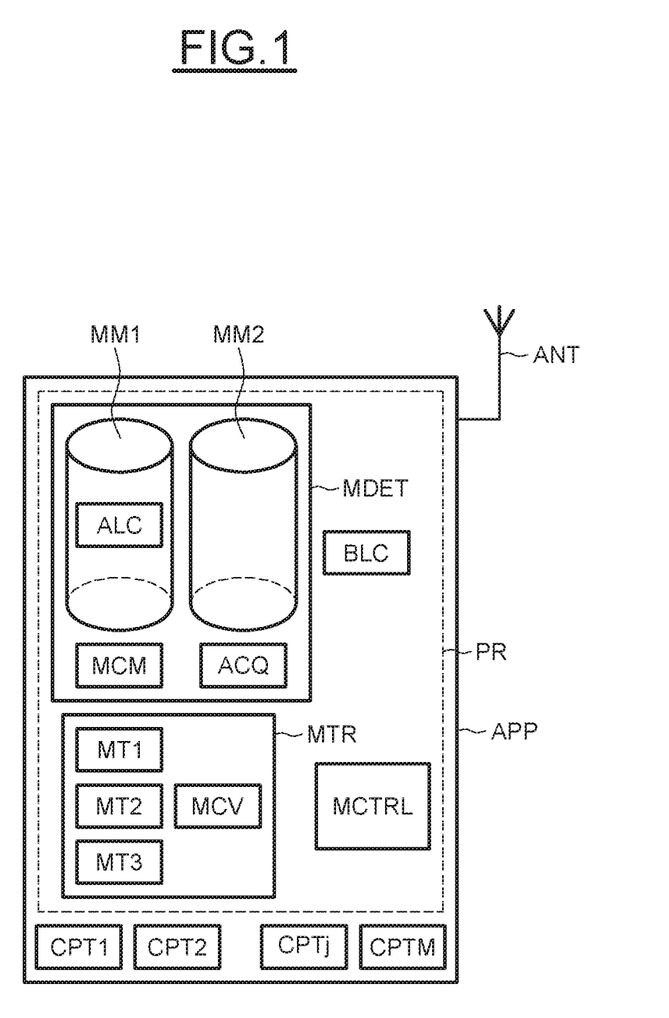
FIGS. 1 to 9 schematically illustrate various implementations and embodiments of the invention.

In FIG. 1, the reference, APP, designates an electronic apparatus that will be considered to be in this non-restrictive example, a wireless communication apparatus provided with an antenna ANT. This apparatus may be a mobile cellular phone such as a smartphone or a digital tablet.

The apparatus APP here comprises multiple measurement sensors, CPT1-CPTj, j=1 to M.

As a guide, the sensors CPTj may be chosen from the group formed by an accelerometer, a gyroscope, a magnetometer, an audio sensor such as a microphone, a barometer, a proximity sensor, and an optical sensor.

Of course, the apparatus may be provided with multiple accelerometers and/or multiple gyroscopes and/or multiple magnetometers and/or multiple audio sensors and/or a barometer, and/or one or more proximity sensors, and/or one or more optical sensors.

Audio sensors are useful environment descriptors. Indeed, if the apparatus is not moving, then the audio sensor may be useful for detecting the nature of this environment. Of course, according to the applications, either environmental sensors of the accelerometer or even gyroscope or magnetometer type may be used, or audio sensors or a combination of these two types of sensors, such as non-inertial sensors of the temperature, humidity or brightness type.

These environmental measurement sensors, may, in particular in a multimodal approach, in combination with a conventional discrimination algorithm ALC, e.g. of the decision tree type, intended to work, for example, on filtered raw data from these sensors, form detector MDET configured for detecting a scene. Detector MDET may thus, for example, detect whether the apparatus APP is located in this or that environment (restaurant, moving vehicle, etc.) or if the bearer of this apparatus (e.g., a smart watch) is performing a specific activity (walking, running, cycling, etc.).

It is now assumed as a non-restrictive example that all the environmental sensors, CPT1-CPTM, help in the detection of the scene and supply the discrimination algorithm ALC with data at measurement instants for making it possible to detect the scene.

The discrimination algorithm implemented in software in the detector MDET here is a decision tree that has undergone a learning phase on an environmental sensor measurement database. Such a decision tree is particularly simple to implement and only requires a few kilobytes of memory and a working frequency of less than 0.01 MHz.

It is stored in a program memory MM1.

As will be seen in more detail below, and as is conventional in the matter, the decision tree ALC operates on an attribute vector $A_i$. The tree includes a series of nodes. Each node is assigned to a test on an attribute.

Two branches emerge from a node.

The choice between the two branches depends on the current value of the attribute associated with this node and therefore the result of the associated test.

Moreover, the output of the tree comprises leaves corresponding to reference scenes that the apparatus APP is designed to detect.

These reference scenes may be, for example, without this being restrictive, "BUS", "OFFICE", "RESTAURANT", "TRAIN" scenes representative, for example, of the environment in which the apparatus APP is located, here the phone.

The detector MDET also comprises an acquisition circuit ACQ configured for acquiring current values of the attributes from the measurement data from the sensors.

In general, an attribute may be an item of raw data from a sensor or an item of filtered raw data, or yet another variable, e.g., a data mean over a certain time interval, a variance, etc.

As will be seen in more detail below, the detector is configured for real-time detection of at least one scene from among the set or corpus of possible reference scenes.

In this respect, the detector MDET comprises a controller MCM configured for activating the software module ALC with the current values of the attributes so as to traverse a path within the decision tree and obtain at the output of the path a scene from among the reference scene set, this obtained scene forming the detected scene.

Moreover, the apparatus also comprises processor MTR configured for developing a confidence index associated with the detected scene.

And, as will be seen in more detail below, the processor MTR is configured for developing the confidence index once the scene has been detected and based on the knowledge of this detected scene.

This confidence index will notably be developed from a set of probabilities contained in a memory MM2 of the detector MDET.

The apparatus APP also comprises a block BLC capable of cooperating with the detector MDET for processing the detected scene and transmitting the information via the antenna ANT of the apparatus. Of course, the antenna is optional if the apparatus is not a connected apparatus.

The apparatus also comprises controller MCTRL configured for successively activating the detector MDET so as to implement a succession of steps of scene detection spaced apart by time intervals.

These various components, BLC, MDET, MCTRL and MTR are, for example, implemented by software modules within the processor PR of the apparatus APP.

Figure 2:
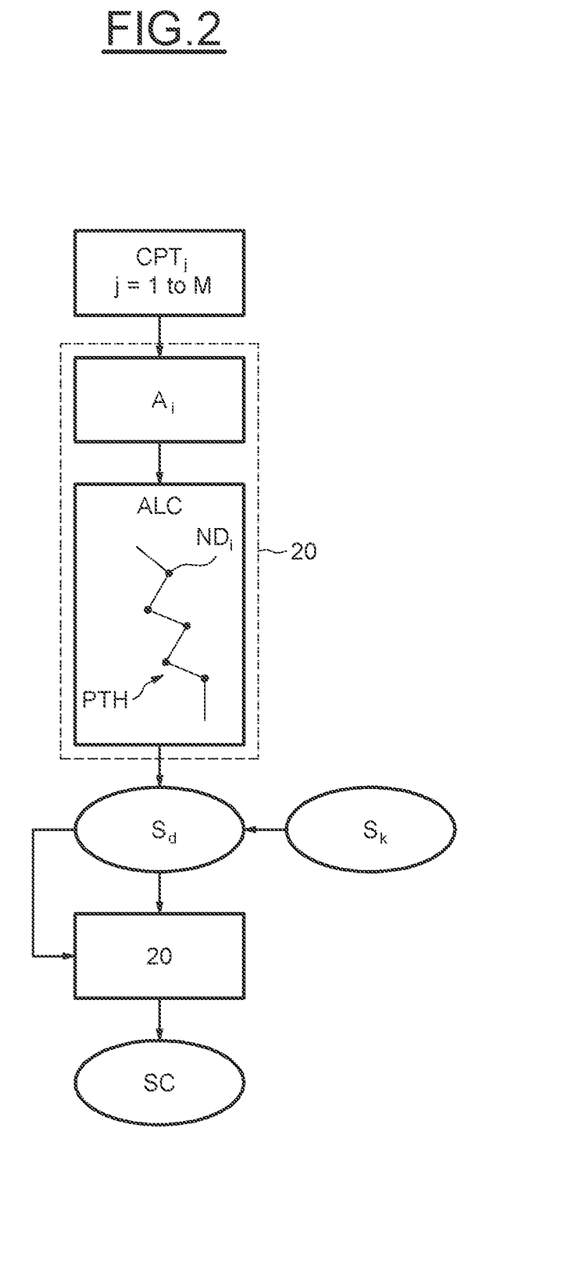

Reference will now be made more particularly to FIG. 2, and following for illustrating an example of confidence index associated with a detected scene.

In FIG. 2, it is assumed that the acquisition circuit ACQ has delivered, from the M sensors, CPTj, j=1 to M, an attribute vector $A_i$ having current values.

The number of attributes $A_i$ is totally independent of the number of sensors.

The controller MCM then activates the software module ALC forming the decision tree with said current values of the attributes $A_i$ so as to traverse a path PTH within this decision tree and obtain at the output of the path a detected scene $S_d$ from among the corpus of reference scenes $S_k$.

A test is assigned in the path PTH on an attribute $A_i$ at each node $ND_i$. This test is, for example, the operator "less than", or "less than or equal to", or "greater than", or "greater than or equal to", or "equal to".

Once this scene $S_d$ is detected, the controller MCM is configured for activating the decision tree ALC a second time with said current values of the attributes $A_i$ and making it traverse said path PTH a second time.

The processor MTR include a first processing module MT1 configured, at each node $ND_i$ of the path, for determining a first probability, $P(A_i|S_d)$, that the corresponding attribute $A_i$ is the current value, knowing the detected scene $S_d$.

Moreover, this first processing module, for each reference scene $S_k$ different from the detected scene, $S_d$ (k=0 to N−1, if it is assumed that there are N reference scenes), will determine a second probability, $P(A_i|S_k)$, that the corresponding attribute $A_i$ has the current value knowing this reference scene $S_k$.

In fact, as will be explained in more detail below, these different first and second probabilities are already stored in the memory MM2 since they have been calculated during an initial phase using histograms for the different possible values of attributes.

Determining these probabilities therefore comes down here to a simple reading in memory.

The second processing module MT2 of the processor MTR will then determine an initial confidence index from all the first and second probabilities.

Finally, a third processing module MT3 may be configured for developing the confidence index from this initial confidence index.

More precisely, this confidence index SC may be the initial confidence index or, for example, the normalized initial confidence index via the length of the path PTH. By way of example, the confidence index SC associated with the detected scene $S_d$ may be determined by Formula (I).

$$SC = \sum_{i \in PTH} \log\left(\frac{P(A_i|S_d)}{\frac{1}{N-1} \cdot \sum_{k=0, \neq d}^{N-1} P(A_i|S_k)}\right) \quad (I)$$

In this Formula (I), "log" designates the base 10 logarithm function. However, the use of a natural logarithm is possible.

As a variant, the confidence index SC may be determined by Formula (II) in which "max" designates the maximum.

$$SC = \sum_{i \in PTH} \log\left(\frac{P(A_i|S_d)}{\max_{k \neq d}(P(A_i|S_k))}\right) \quad (II)$$

As a variant, it would be possible to determine the confidence index SC from Formula (III) given in which the coefficients $w_i$ are weighting coefficients chosen to give more weight to the logarithms associated with the first nodes of the path PTH.

$$SC = \sum_{i \in PTH} w_i \log\left(\frac{P(A_i | S_d)}{\frac{1}{N-1} \cdot \sum_{k=0, \neq d}^{N-1} P(A_i | S_k)}\right) \quad (III)$$

Each weighting coefficient $w_i$ is, for example, positive.

Thus, the weighting coefficient $w_i$ associated with a current node NDi may be equal to the square root of the weighting coefficient $w_{i-1}$ associated with the preceding node if the initial coefficient is greater than 1.

The first weighting coefficient may, for example, be equal to 1.6.

As a variant, the weighting coefficient associated with a current node of rank i may be taken as equal to $\alpha_i$, where $\alpha$ is a positive coefficient and less than 1, e.g. equal to 0.9.

The weighting is then exponentially decreasing.

The SC score forms a confidence index associated with the detected scene $S_d$.

Indeed, the lower the value of the score (the greater the absolute value of the value for negative values or the lower the absolute value of the value for positive values), the lower the confidence, i.e., the reliability, of detection. In other words, there is a strong chance that the detected scene does not correspond to the scene in which the apparatus is actually located. Conversely, the higher the score, the higher the confidence, i.e., the reliability, of scene detection, i.e. there is a strong chance that the detected scene is actually the correct one.

As a guide, the values of the score may, for example, vary between $-20$ and $+20$.

However, the processor MTR may further comprise a converter MCV, for example, also implemented in software form configured for converting the confidence index SC into a confidence probability using a conversion function stored in the memory MM2, for example.

Figure 3:
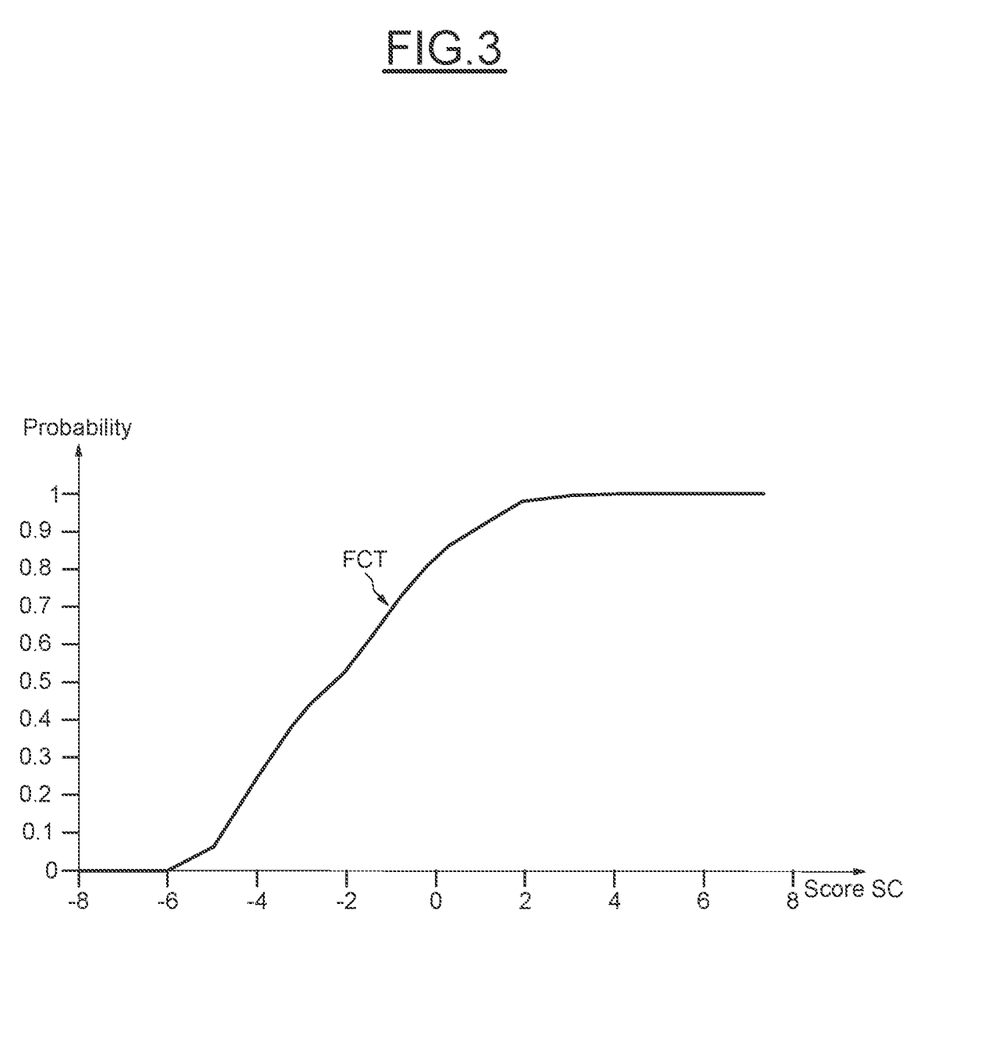

One example of such a conversion function FCT is, for example, illustrated in FIG. 3.

In the illustrated example, the function FCT has a form of a sigmoid and comprises scores between $-8$ and $+8$ in the abscissa.

More details will be given below regarding an example of determining such a transfer function FCT.

Figure 4:
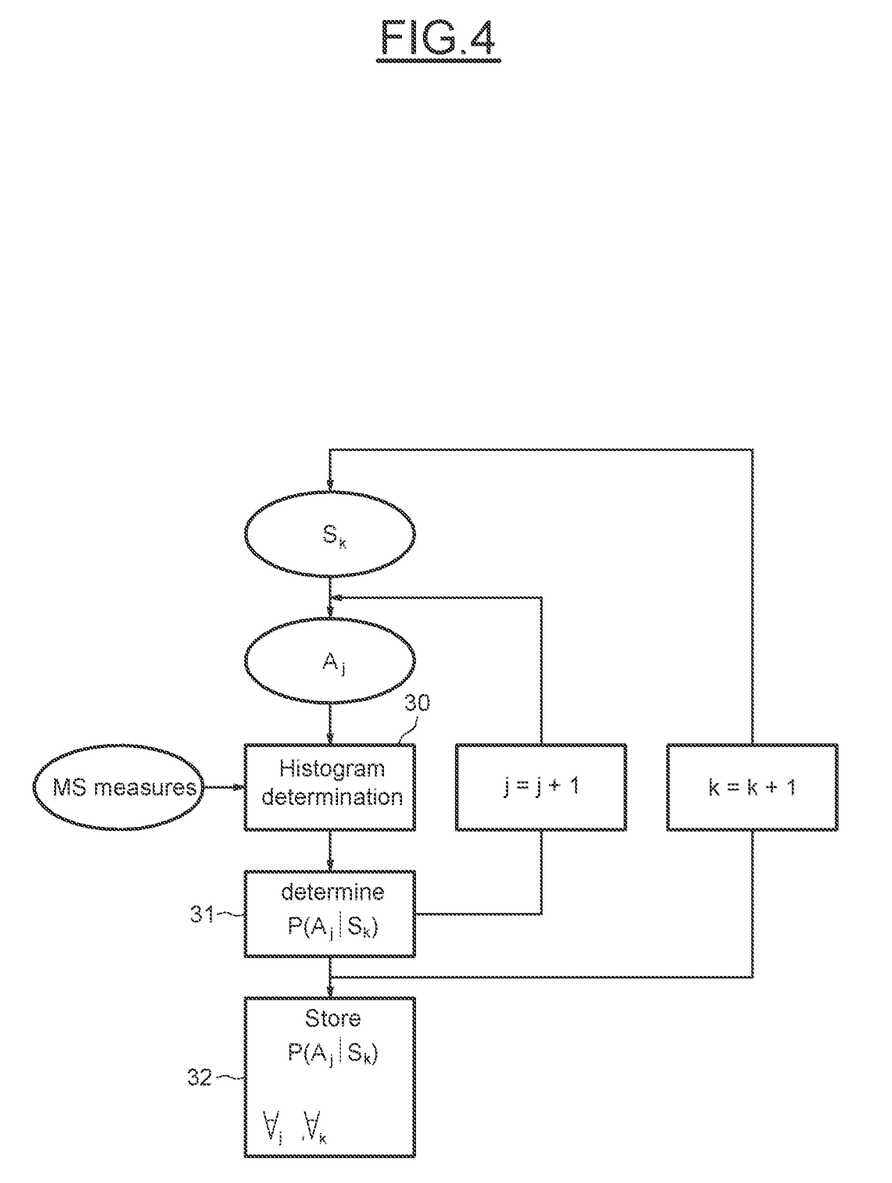

Reference will now be made more particularly to FIG. 4 for illustrating an example of determining probabilities that the attributes have given current values knowing a detected scene.

More precisely, for each scene $S_k$ of the corpus of reference scenes, for each attribute $A_j$, a number of measurements will be performed, e.g. 100,000 measurements, with different types of apparatus APP provided with different sensors one of which supplies the considered attribute, all of these apparatuses being placed in a condition corresponding to the reference scene at different places on the planet.

For example, if the scene $S_k$ is a "BUS" scene the different apparatuses will be placed in BUSes and the different values will be studied of the attribute $A_j$ supplied by the corresponding sensor or sensors with which the different apparatuses APP are provided.

The MS measurements (MS=100,000, for example) having supplied for the attribute $A_j$, MS current values, make it possible to determine a histogram for these values (step 30). From this histogram, knowing the number MS and the number of times that a current value belongs to a given time interval (corresponding to a given granularity), it is therefore possible to determine (step 31) the probability, $P(A_j|S_k)$, that the attribute $A_j$ has this current value knowing the scene $S_k$.

These operations are repeated for all the attributes $A_j$ and for all the reference scenes $S_k$ belonging to the reference scene corpus and the set of probabilities is then stored (step 32) in the memory MM2.

The first processing module, at each node NDi of the path PTH of the decision tree, may therefore easily read the probability that the considered attribute has the current value associated with this node knowing the detected scene $S_d$, and also read the probability that the considered attribute has the current value associated with this node knowing a scene $S_k$ different from the scene $S_d$.

Figure 5:
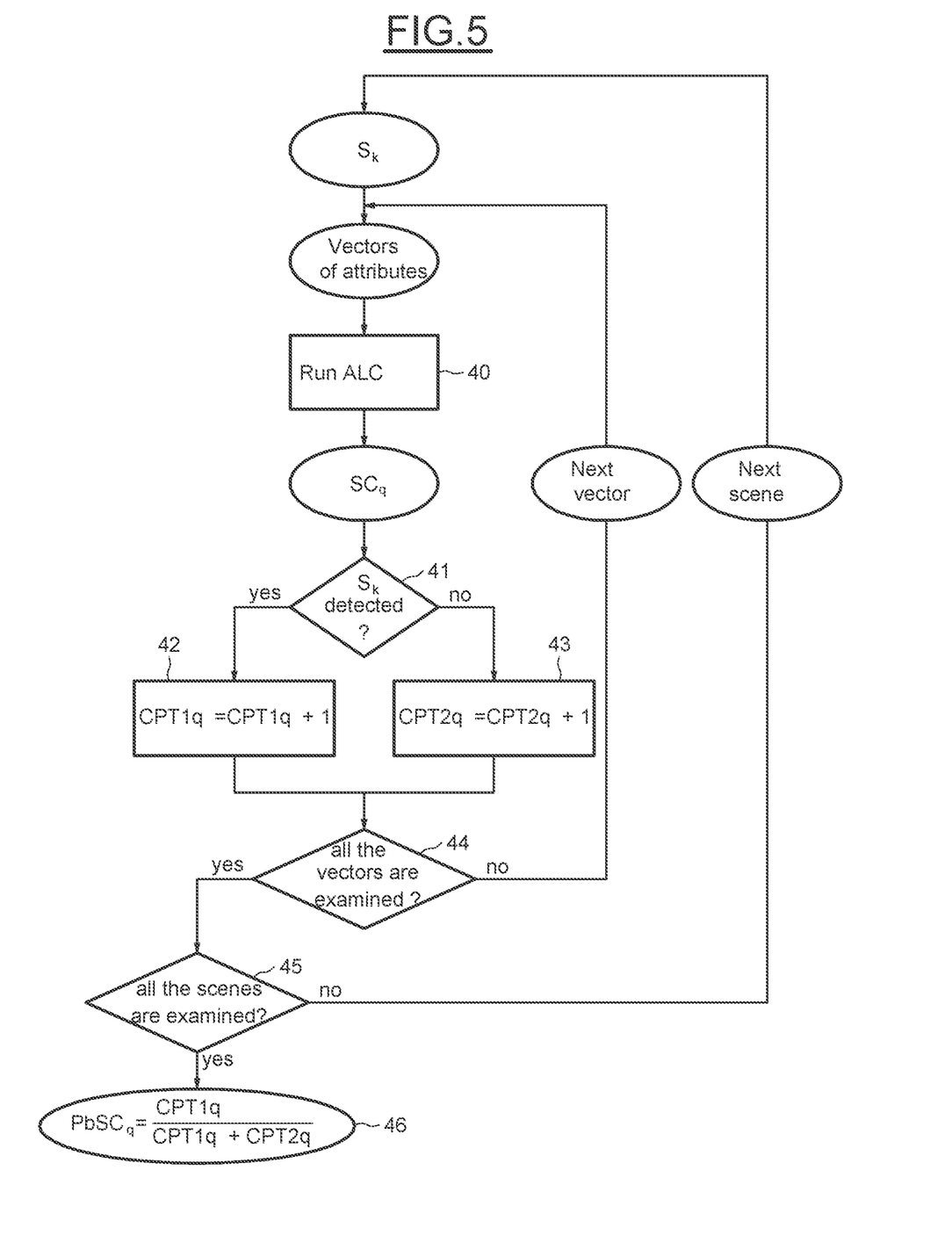

Reference will now be made more particularly to FIG. 5 for describing an example of obtaining the transfer function FCT making it possible to convert the scores SC into confidence probability.

It is assumed in this example that all the scores SC vary between $-8$ and $+8$ and a granularity is defined equal, for example, to 0.5.

In other words, any score value greater than or equal to q and less than q+0.5 will be assigned an arbitrary score value SCq equal to q.

Moreover, a first counter CPT1q and a second counter CPT2q will be assigned to each value SCq, the meaning of which will be returned to in more detail below.

It was seen previously that a number of measurements were performed for determining the different probabilities of the attribute values knowing particular scenes.

Accordingly it is assumed here that a number, e.g. 100,000, of attribute vectors have been obtained corresponding to the different reference scenes of the scene corpus.

Among these 100,000 attributes, there may be, for example, a first number corresponding to a first reference scene, a second number corresponding to a second reference scene and so on.

As illustrated in FIG. 5, as a guide but not restrictively, all the attribute vectors may be examined corresponding to a given reference scene $S_k$, then all the attribute vectors corresponding to another reference scene may be examined and so on.

Of course, as a variant, it would be possible to examine these attribute vectors in another order even if it means interleaving them.

In the present case, the decision tree ALC is traversed (step 40) with a first attribute vector corresponding to the reference scene $S_k$ and thus a score SCq is obtained that could be calculated according to one of Formulae (I), (II) or (III) previously indicated.

In step 41 it is then examined whether the scene that was detected at the output from the tree ALC actually corresponds to the scene $S_k$.

If such is the case, the counter CPT1q is incremented (step 42).

Otherwise, the counter CPT2q is incremented (step 43).

Then, these operations 40, 41, 42 and 43 are repeated for each other attribute vector associated with the reference scene $S_k$.

When all the attribute vectors have been examined (step 44) the next reference scene is considered and the operations, 40, 41, 42, 43, 44 are repeated, until all the reference scenes have been examined (step 45).

Once all the reference scenes have been examined, i.e., all the attribute vectors have been considered, it is then possible to determine for each score, SCq, the confidence probability PbSCq equal to the ratio between the value of the counter CPT1q and the sum of the values of the two counters, CPT1q and CPT2q (step 46).

The probability values between the different discrete values PbSCq may then be obtained, for example, by an interpolation, in particular a linear interpolation.

In some embodiments, some attributes are not necessarily relevant for discriminating reference scenes.

This is true for any type of classifier, in particular a decision tree, and everything that follows applies to any type of classifier, in particular to a decision tree.

For the purposes of simplifying the text, only the decision tree will be mentioned in the rest of this description.

It is particularly useful when constructing a decision tree, to take into account only the most statistically relevant attributes from a whole list of possible attributes.

This makes it possible to reduce the size of the decision tree, and accordingly the memory size needed for its implementation while simplifying this implementation.

An example of preliminary determining 60 of attributes $A_i$ is illustrated in FIGS. 6 to 9.

Figure 6:
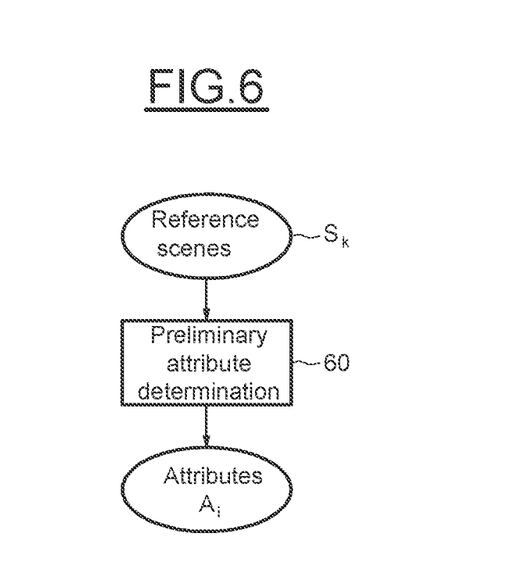

More precisely, the preliminary phase 60 for determining attributes comprises a development 600, for each reference attribute $A_r$ of a set of possible reference attributes, a merit factor, $\gamma(A_r)$, representative of the ability of the reference attribute to discriminate the different reference scenes, and a selection 601 of said attributes $A_i$ of the decision tree from among the reference attributes $A_r$ according to their merit factor.

Figure 7:
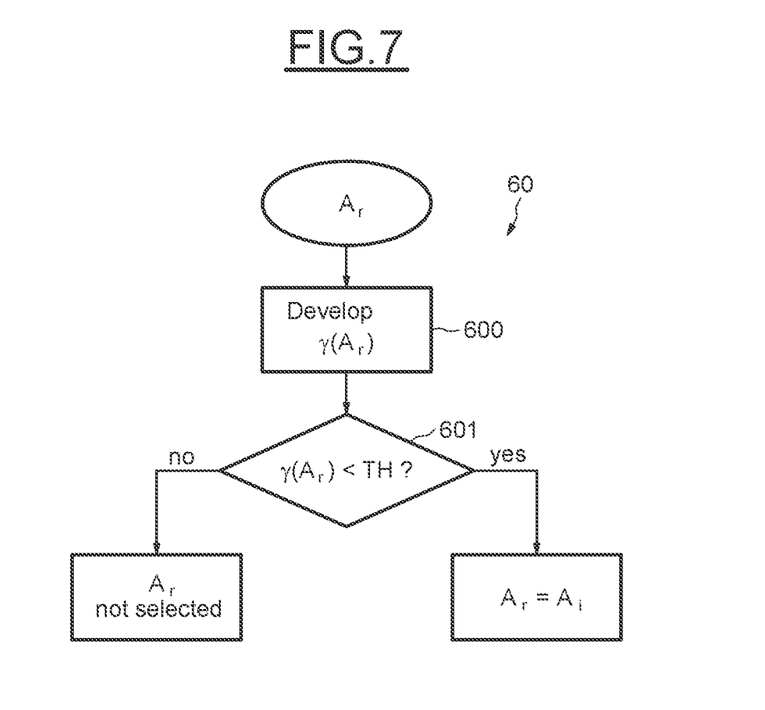

And, as illustrated in FIG. 7, this selection includes for each reference attribute $A_r$ a comparison of the value of its merit factor, $\gamma(A_r)$, with a threshold TH.

Then the attributes $A_r$ having a merit factor below the threshold are selected as attributes $A_i$.

Figure 8:
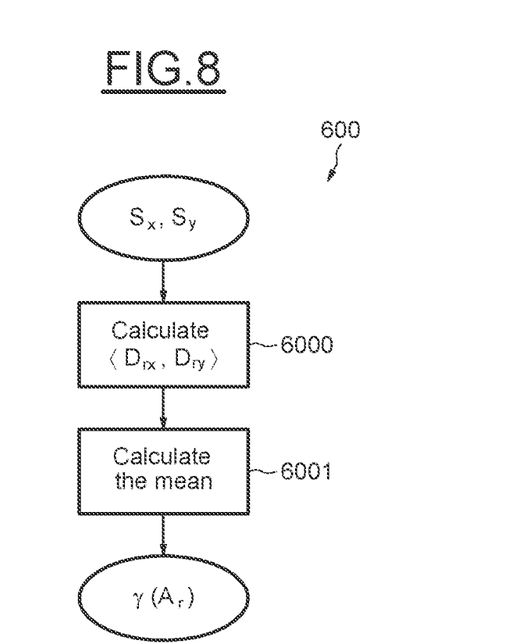

As illustrated in FIG. 8, the development of the merit factor, $\gamma(A_r)$, of a reference attribute, includes a development of intermediate parameters relating to pairs of reference scenes $S_x$, $S_y$.

The development of each intermediate parameter relating to a pair of reference scenes $S_x$, $S_y$ comprises a calculation 6000 of the canonical scalar product between a first distribution $D_{rx}$ of probabilities of the values of the reference attribute knowing a first reference scene $S_x$ and a second distribution $D_{ry}$ of probabilities of the values of the reference attribute knowing a second reference scene $S_y$.

$D_{rx}$ is equal to P ($A_r|S_x$) and $D_{ry}$ is equal to P ($A_r|S_y$).

This scalar product, $S_{xy}(A_r)$, is defined by Formula (IV).

$$S_{xy}(A_r) = \langle D_{rx}, D_{ry} \rangle \tag{IV}$$

In this formula, the scalar product of two discrete functions having n components is defined as being the sum of the n elementary products of the homologous components of the two functions.

The intermediate parameter relating to a scene pair $S_x$, $S_y$ is equal to $S_{xy}(A_r)/(S_{xx}(A_r) \cdot S_{yy}(A_r))^{1/2}$.

Then, the mean, $\text{mean}_{x,y}$, of all the intermediate parameters is calculated (step 600i) (Formula V) for all the pairs of reference scenes $S_x$, $S_y$.

$$\gamma(A_r) = \text{mean}_{x,y} \left( \frac{S_{xy}(A_r)}{\sqrt{S_{xx}(A_r)S_{yy}(A_r)}} \right) \tag{V}$$

It is, moreover, preferable, but not essential, that each first distribution of probabilities $D_{ix}$ and each second distribution of probabilities $D_{iy}$ results from a filtering 90 (FIG. 9) of the values of the considered attribute $A_i$ for the considered reference scene $S_j$.

Figure 9:
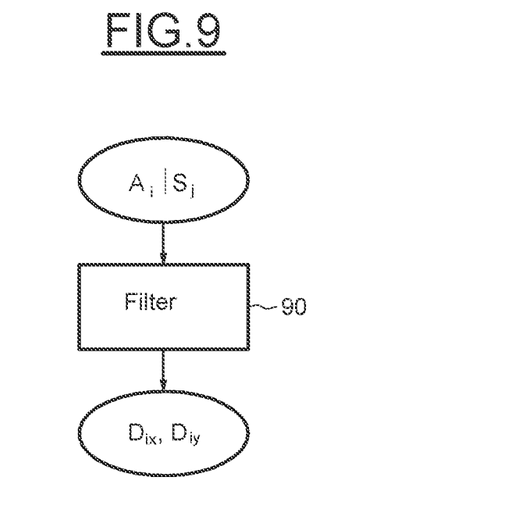

More precisely, for each attribute $A_i$ and for each scene $S_j$ the parameters, $\min_{i,j} = \min(A_i|S_j)$, and $\max_{i,j} = \max(A_i|S_j)$, are calculated. The min and max respectively designate the minimum and maximum values of the values of the attribute $A_i$ knowing the scene $S_j$.

Then, the values outside the interval [max ($\min_{i,j}, \mu_{i,j} - 3\sigma_{i,j}$) . . . $\min(\max_{i,j}, \mu_{i,j} + 3\sigma_{i,j})$] are eliminated.

In this interval, $\mu_{i,j}$ and $\sigma_{i,j}$ are respectively defined by Formulae (VI) and (VII) as follows. In Formula (VI) "mean" is the "mean" operator.

$$\mu_{i,j} = \text{mean}(A_i | S_j) = \frac{1}{N_{i,j}} \sum_{k=0}^{N_{i,j}-1} A_{i,k} \tag{VI}$$

$$\sigma_{i,j} = \sqrt{\left( \frac{1}{N_{i,j}} \sum_{k=0}^{N_{i,j}-1} A_{i,k}^2 \right) - \mu_{i,j}^2} \tag{VII}$$

In Formulae (VI) and (VII), $A_{i,k}$ represents the value of the attribute i of the vector k. This vector belongs to a scene j.

In Formula (VI) summing is done using all the vectors of the database associated with a scene j in order to calculate the mean value of the attribute i for the scene j.

Formula (VII) makes it possible to determine the standard deviation associated with this mean value.

Of course, the aforementioned interval is only a non-restrictive example of possible interval.

As mentioned before, although this preliminary phase 60 for determining the most relevant attributes has been described in relation to a decision tree, this preliminary determining of attributes may be applied to any classification algorithm, e.g. neural networks, or algorithms known to the person skilled in the art under the term "Support Vector Machines" or "Gaussian Mixture Model".

What is claimed is:

1. A method of analyzing a scene, the method comprising:
    identifying the scene as a detected scene from among a set of reference scenes according to a current value of each attribute of a plurality of attributes, the scene encompassing a scene characteristic of an environment in which an apparatus is located, wherein the apparatus is carried by a user capable of movement or a fixed object, wherein the scene characteristic of the environment comprises movement of the apparatus, noise level of the environment, altitude of the environment, or brightness level of the environment, and wherein the plurality of attributes are associated with the set of reference scenes;
    developing a confidence index of an identification of the scene as the detected scene, according to a knowledge of the detected scene; and
    outputting the identification of the detected scene and the confidence index associated with the identification;
    wherein identifying the scene comprises:
        for each attribute of the plurality of attributes, using a sensor to acquire the current value of the attribute in the scene from a measurement by the sensor of the attribute from the scene;
        traversing a path through a decision tree for a first time according to the current value of each attribute of the plurality of attributes, wherein the decision tree comprises a plurality of nodes, and wherein each node of the plurality of nodes is associated with a test on a value of an attribute associated with the node, and the traversing includes considering at each node along the path, the current value of the attribute corresponding to the node; and obtaining, as an output of the path, an identification of which reference scene is a detected scene from the set of reference scenes, according to the current value of each attribute in the plurality of attributes measured from the scene.

2. The method according to claim 1, wherein developing the confidence index comprises:

acquiring a knowledge of the detected scene in response to the identifying the detected scene; and developing the confidence index according to the knowledge of the detected scene.

3. The method according to claim 1, wherein developing the confidence index comprises traversing the path for a second time, in response to identifying the detected scene, by using the same current value of each attribute used when traversing the path for the first time; and wherein traversing the path for the second time comprises performing the following at each node along the path:

determining a first probability that the current value of an attribute corresponding to the node is identifiable with the detected scene, according to a knowledge of the detected scene;

determining a second probability that the current value of the attribute corresponding to the node is identifiable with a reference scene different from the detected scene, according to a knowledge of the reference scene; and developing an initial confidence index in response to traversing the path for the second time, according to the first probability and the second probability determined at each node along the path.

4. The method according to claim 3, wherein determining the initial confidence index comprises:

for each node along the path, determining a mean of the second probability associated with the node, and a logarithm of a ratio between the first probability associated with the node and the mean; and adding together the logarithm for each node along the path to determine a sum of a plurality of logarithms across a plurality of nodes along the path.

5. The method according to claim 4, wherein determining the initial confidence index further comprises determining, for each node along the path, a weighted logarithm by weighting the logarithm associated with the node with a weighting coefficient, wherein the logarithm associated with a preceding node is weighted more than the logarithm associated with a subsequent node along the path; and wherein adding together the logarithm for each node along the path comprises adding together the weighted logarithm for each node along the path to determine a sum of a plurality of weighted logarithms across the plurality of nodes along the path.

6. The method according to claim 5, wherein each weighting coefficient is a positive number.

7. The method according to claim 6, wherein, when a first weighting coefficient, for a logarithm associated with a first node along the path, is greater than one, determining the weighted logarithm includes:

setting, for a logarithm associated with each subsequent node in the plurality of nodes along the path that follow the first node, a weighting coefficient at a value that is equal to a square root of a weighting coefficient for a logarithm associated with a preceding node.

8. The method according to claim 6, wherein determining the weighted logarithm includes setting, for a logarithm associated with a node of rank i in the plurality of nodes along the path, a weighting coefficient at a value that is equal to $\alpha i$, wherein $\alpha$ is a positive number that is less than 1.

9. The method according to claim 3, wherein determining, at each node, the second probability comprises determining, at the node, a plurality of second probabilities, wherein each second probability is associated with another reference scene in the set of reference scenes different from the detected scene; and wherein the determining the initial confidence index comprises:

determining, for each node of the path, a maximum of the plurality of second probabilities associated with the node, and a logarithm of a ratio between the first probability associated with this node and the maximum; and adding together the logarithm for each node along the path to determine a sum of a plurality of logarithms across the plurality of nodes of the path.

10. The method according to claim 3, wherein the determining the initial confidence index comprises normalizing the initial confidence index by a length of the path.

11. The method according to claim 1, wherein further comprising converting the confidence index into a confidence probability according to a predetermined conversion function.

12. The method according to claim 1, further comprising determining the plurality of attributes according to the set of reference scenes, before the identifying the detected scene.

13. The method according to claim 12, wherein determining the plurality of attributes comprises:

identifying a set of reference attributes;

developing, for each reference attribute, a merit factor according to an ability of the reference attribute to discriminate between reference scenes in the set of reference scenes; and selecting the plurality of attributes for the decision tree from among the set of reference attributes in accordance with the merit factor for each reference attribute.

14. The method according to claim 13, wherein the selecting comprises, for each reference attribute:

comparing with a threshold, a value of the merit factor that is associated with the reference attribute; and selecting the reference attribute for the plurality of attributes when the value of the merit factor is below the threshold.

15. The method according to claim 13, wherein developing, for each reference attribute, the merit factor comprises:

developing a plurality of intermediate parameters relating to the reference attribute, wherein each intermediate parameter in the plurality of intermediate parameters is associated with a pair of a first reference scene and a second reference scene from the set of reference scenes, and wherein the pair is one of a plurality of pairs of reference scenes that are each different from one another; and determining a mean of the plurality of intermediate parameters for the reference attribute;

wherein developing the plurality of intermediate parameters comprises calculating, for each intermediate parameter, a canonical scalar product between a first distribution of probabilities of a plurality of values of the reference attribute, knowing the first reference scene in the pair associated with the intermediate parameter, and a second distribution of probabilities of the plurality of values of the reference attribute, knowing the second reference scene in the pair associated with the intermediate parameter.

16. The method according to claim 15, wherein calculating, for each intermediate parameter, the canonical scalar product comprises obtaining the first distribution of probabilities and the second distribution of probabilities from a filtering of values of the reference attribute for each reference scene.

17. The method according to claim 1, wherein the sensor comprises an accelerometer, a gyroscope, a magnetometer, an audio sensor, a barometer, a proximity sensor, an optical sensor, a temperature sensor, a humidity sensor, or a brightness sensor.

18. An apparatus, comprising:
a processor;
a sensor coupled to the processor, wherein the sensor is configured to measure a current value of each attribute of a plurality of attributes for a scene encompassing a scene characteristic of an environment in which the apparatus is located, wherein the apparatus is carried by a user capable of movement or a fixed object, wherein the scene characteristic of the environment comprises movement of the apparatus, noise level of the environment, altitude of the environment, or brightness level of the environment;
a non-transitory memory coupled to the processor, wherein a plurality of instructions are stored in the non-transitory memory that, when executed by the processor, cause the apparatus to:
identify the scene as a detected scene from among a set of reference scenes;
develop a confidence index associated with a knowledge of the detected scene from identifying the detected scene; and
output the identification of the detected scene and the confidence index associated with the identification;
wherein the plurality of instructions that, when executed by the processor, cause the apparatus to identify the scene as the detected scene, comprises instructions to:
acquire, for each attribute of the plurality of attributes, the current value of the attribute measured by the sensor;
perform a first traversal of a path within a decision tree according to the current value of each attribute of the plurality of attributes, wherein the decision tree comprises a plurality of nodes, and wherein each node of the plurality of nodes is associated with a test on a value of an attribute associated with the node, and the path is selected along a set of nodes, according to an outcome of each test of a current value of an attribute associated with each node along the path; and
obtain, at an output of the path, from among a set of a plurality of reference scenes, a reference scene consistent with the scene, according to the plurality of attributes;
wherein the detected scene comprises the reference scene that is consistent with the scene according to the plurality of attributes.

19. The apparatus according to claim 18, wherein the plurality of instructions that, when executed by the processor, cause the apparatus to develop the confidence index comprises instructions to:
perform a second traversal of the path of the decision tree in response to identifying the detected scene, by, at each node:
determining a first probability that the current value of an attribute corresponding to the node is identifiable with the detected scene, according to a knowledge of the detected scene;
determining a second probability that the current value of the attribute corresponding to the node is identifiable with a reference scene different from the detected scene, according to a knowledge of the reference scene; and
writing the first probability and the second probability into the non-transitory memory;
read the first probability and the second probability for each node that is written in the non-transitory memory; and
determine an initial confidence index according to the first probability and the second probability for each node that is read in the non-transitory memory.

20. The apparatus according to claim 18, wherein the sensor comprises an accelerometer, a gyroscope, a magnetometer, an audio sensor, a barometer, a proximity sensor, an optical sensor, a temperature sensor, a humidity sensor, or a brightness sensor.

21. The apparatus according to claim 18, wherein the apparatus is disposed in an end user device that comprises cellular phone, a digital tablet or a smart watch;
wherein the scene is a current scene characteristic of an environment where the end user device is located, or of an activity engaging an end user bearing the end user device; and
wherein the end user device receives an output of an identification of the detected scene and the confidence index from the apparatus, and performs, according to the output, an execution of a program or a provision of a service.

22. A scene classifier, comprising:
a sensor configured to measure a value for an attribute of a scene, the scene encompassing a scene characteristic of an environment in which an apparatus including the sensor is located, wherein the apparatus is carried by a user capable of movement or a fixed object, wherein the scene characteristic of the environment comprises movement of the apparatus, noise level of the environment, altitude of the environment, or brightness level of the environment, and wherein the attribute is one of a plurality of attributes associated with the scene;
a computing device coupled to the sensor, wherein the computing device includes a non-transitory medium storing a plurality of software modules executable by the computing device; and
a controller coupled to the sensor and the computing device;
wherein the plurality of software modules comprise:
a decision tree module configured to form a decision tree with a plurality of nodes, wherein the plurality of nodes provide a plurality of paths through the decision tree, with each node associated with a test on a value of an attribute of the plurality of attributes that are associated with a set of reference scenes, in accordance with a knowledge of the set of reference scenes;
a detecting module configured to:
traverse a path through the decision tree, for a first time, by testing, at each node along the path, a current value of the attribute associated with the node that is measured by the sensor from the scene; and detect at a first output of the path, which reference scene is identifiable with the scene, wherein the reference scene that is identifiable comprises a detected scene, with each remaining reference scene in the set of reference scenes comprising another reference scene; and a soft decision module configured to develop a confidence index associated with the first output of the path, based upon a knowledge of the detected scene and of the other reference scenes in the set after traversing the path for the first time;

wherein the controller is configured to activate the detecting module to traverse the path for the first time in response to a supply of measurements by the sensor for each attribute in the plurality of attributes.

23. The scene classifier according to claim 22, wherein the controller is further configured to activate the detecting module to traverse for a second time, a same path as the path traversed the first time, in response to the first output of the path from the detecting module, with a current value of each attribute of the plurality of attributes being the value measured by the sensor for the attribute used in traversing the path for the first time; and wherein the soft decision module is configured to develop the confidence index according to a traversal of the path for the first time and the second time, by being configured to:

determine, at each node along the path, for the test of the attribute associated with the node, a first probability of the scene being the detected scene, according to a knowledge of the attribute in the detected scene, and a second probability of the scene being the other reference scene, according to a knowledge of the attribute in the other reference scene;

obtain an initial confidence index according to a plurality of first probabilities and a plurality of second probabilities determined across the plurality of nodes along the path, in response to traversing the path for the first time and the second time; and develop the confidence index from the initial confidence index.

24. A method of analyzing a scene, the method comprising:

identifying the scene as a detected scene from among a set of reference scenes, according to a current value of each attribute of a plurality of attributes, wherein the plurality of attributes are associated with the set of reference scenes;

developing a confidence index of an identification of the scene as the detected scene, according to a knowledge of the detected scene;

outputting the identification of the detected scene and the confidence index associated with the identification;

wherein identifying the scene comprises for each attribute of the plurality of attributes, using a sensor to acquire the current value of the attribute in the scene from a measurement by the sensor of the attribute from the scene, traversing a path through a decision tree for a first time according to the current value of each attribute of the plurality of attributes, wherein the decision tree comprises a plurality of nodes, and wherein each node of the plurality of nodes is associated with a test on a value of an attribute associated with the node, and the traversing includes considering at each node along the path, the current value of the attribute corresponding to the node, and obtaining, as an output of the path, an identification of which reference scene is a detected scene from the set of reference scenes, according to the current value of each attribute in the plurality of attributes measured from the scene; and wherein developing the confidence index comprises traversing the path for a second time using the same current value of each attribute used when traversing the path for the first time in response to identifying the detected scene.

* * * * *